United States Patent [19]
Bieniek et al.

[11] Patent Number: 5,481,667
[45] Date of Patent: Jan. 2, 1996

[54] METHOD AND SYSTEM FOR INSTRUCTING A USER OF A COMPUTER SYSTEM HOW TO PERFORM APPLICATION PROGRAM TASKS

[75] Inventors: Cynthia L. Bieniek, Bellevue; Ross A. Hunter, Woodinville; Timothy P. McKee, Seattle; David H. Schroeder, Redmond, all of Wash.

[73] Assignee: Microsoft Corporation, Redmond, Wash.

[21] Appl. No.: 835,213

[22] Filed: Feb. 13, 1992

[51] Int. Cl.$^6$ .................................................. G06F 17/30
[52] U.S. Cl. ........................................... 395/161; 395/155
[58] Field of Search .................................. 395/155, 159, 395/161, 157, 158

[56] References Cited

U.S. PATENT DOCUMENTS

| | | | |
|---|---|---|---|
| 4,622,013 | 11/1986 | Cerchio | 434/118 X |
| 4,789,962 | 12/1988 | Berry et al. | 395/155 X |
| 4,992,972 | 2/1991 | Brooks et al. | 395/155 |
| 5,175,812 | 12/1992 | Krieger | 395/155 X |
| 5,179,654 | 1/1993 | Richards et al. | 395/155 |
| 5,235,679 | 8/1993 | Yoshizawa et al. | 395/161 X |

OTHER PUBLICATIONS

Mastering Wordperfect 5.1×5.2 for Windows (Trademark of Sybex), 1991, pp. 57 & 62–66.
Mastering Wordperfect (Trademark of Sybex Inc.), 1991, p. 1085.

Primary Examiner—Heather R. Herndon
Assistant Examiner—Cliff Nguyen Vo
Attorney, Agent, or Firm—Seed and Berry

[57] ABSTRACT

A method and computer system for coaching a user how to perform application program tasks is provided. The user activates the coaching program of the present invention while an application program is running on the computer system. If the user needs such assistance, the coaching program helps the user determine the next task the user wishes to perform in the application program. The coaching program then determines if the application program is in the correct state for performance of the next task. If the application program is not in the correct state, the coaching program guides the user through performing essential preliminary tasks that place the application program in the correct state for performance of the next task. The computer system simultaneously displays on the display screen output, such as application program instructions, generated by the coaching program and a user interface display generated by the application program. Output generated by the coaching program always overlays the user interface display in such a way that it does not block the working portion of the user interface display and it does not interrupt the operation of the application program. The user performs the next task in the application program by interacting with the working portion of the user interface display, while the computer system continues to display the output generated by the coaching program. This enables the user to read instructions displayed on the display screen on how to perform the next task during performance of the next task.

33 Claims, 7 Drawing Sheets

FIG. 5

| Preliminary Task Options (24) | Essential Prerequisite Task? (53) | DLL Question Asked (51a) | Remedy1 (52a) | DLL Question Asked (51b) | Remedy2 (52b) |
|---|---|---|---|---|---|
| See what databases and tables are. | none | | | | |
| Create or open a database. | none | | | | |
| Create or open a table. | none | | | | |
| Modify a table design. | Table open in design view. | Is a table open? | Open table in design view. | Is open table in design view? | Switch to design view. |
| Choose a data type. | Table open in design view. | Is a table open? | Open table in design view. | Is open table in design view? | Switch to design view. |
| Set field properties. | Table open in design view. | Is a table open? | Open table in design view. | Is open table in design view? | Switch to design view. |
| Set a primary key. | Table open in design view. | Is a table open? | Open table in design view. | Is open table in design view? | Switch to design view. |
| Create an index. | Table open in design view. | Is a table open? | Open table in design view. | Is open table in design view? | Switch to design view. |
| Save a table design. | Table open in design view. | Is a table open? | Open table in design view. | Is open table in design view? | Switch to design view. |
| Import or access existing data. | none | | | | |
| Create relationships between tables. | none | | | | |
| Enter, edit, or view data. | Table open in datasheet view. | Is a table open? | Open table in datasheet view. | Is open table in datasheet view? | Switch to datasheet view. |

|   | Preliminary Task Options | Subtask(s)* |
|---|---|---|
| 1 | See what databases and tables are. | same |
| 2 | Create or open a database. | Create a database. |
|   |   | Open a database. |
| 3 | Create or open a table. | Create a table. |
|   |   | Open a table in design view. |
|   |   | Open a table in datasheet view. |
| 4 | Modify a table design. | Add a field. |
|   |   | Delete a field. |
|   |   | Move a field. |
|   |   | Change the data type of a field. |
|   |   | Reset the table's primary key. |
|   |   | Set field properties. |
|   |   | Save the table design. |
| 5 | Choose a data type. | same |
| 6 | Set field properties. | Make validation rules. |
|   |   | Save disk space and speed up queries. |
|   |   | Set the format for displaying data. |
|   |   | Set defaults for field labels. |
| 7 | Set a primary key. | same |
| 8 | Create an index. | same |
| 9 | Save a table design. | same |
| 10 | Import or access existing data. | Import data. |
|   |   | Attach tables. |
| 11 | Create relationships between tables. | same |
| 12 | Enter, edit, or view data. | Preliminary task options for "Work with Data" cue cards. |

*All of the subtasks listed here are user selected options. None are identified by asking a DLL question.

*FIG. 6*

METHOD AND SYSTEM FOR INSTRUCTING A USER OF A COMPUTER SYSTEM HOW TO PERFORM APPLICATION PROGRAM TASKS

TECHNICAL FIELD

This invention relates generally to a computer coaching system and, particularly, to a method and system of implementing an on-line coaching system for teaching a user of an application program how to perform basic application program tasks.

BACKGROUND OF THE INVENTION

Written descriptions of a computer application program, known as documentation, are a key feature of modern computer software. Computer users are most familiar with two categories of documentation: printed references and tutorials, and on-line references and tutorials. An example of a printed reference is a reference manual, which sets out complete instructions for a program in a systematic way, such that related information is usually grouped together. A user usually consults an index to a reference manual to find all references to a particular topic. Printed tutorials provide the user with a lesson plan and specific data to practice performing application program tasks.

On-line references are similar to printed references, with the exception that on-line references may be selectively displayed by the computer as the program runs. Many computer programs include a help key that the user may depress when on-line documentation is needed. The help key may or may not be context-sensitive. Context-sensitivity refers to when the reference information is tied to what the user is doing in the program at the time the help key is pressed. For example, in a word processing environment, a context-sensitive help key will give a user information about how to edit if the help key is pressed while the user is editing, or about how to print if the help key is pressed while the user is preparing to print. When using a graphical user interface such as Microsoft Windows, a list of topics pertaining to a certain window is displayed if the window is open when the help key is depressed.

An on-line tutorial serves as an introduction for a new user of a computer application program. An on-line tutorial provides information in a linear order which may not be the order in which the user wants to learn or perform tasks. The information is arranged into a series of lessons, in which the user is shown how to perform different application program tasks. After a demonstration, the user is given a chance to practice performing some of the tasks using canned data. An on-line tutorial can run concurrently or on top of an application, but the user cannot do real work while the tutorial is running. Instead, the user must follow the instructions in the tutorial and practice performing tasks using canned examples. The data and computer/user interaction are part of a script previously developed by a programmer.

Although each of the above types of documentation serve a useful purpose, they have their limitations. Printed references require a user to take the time to stop what the user is doing, locate the user's reference manuals, and then search through the manuals for specific information. Further, to do so, a user must know what to look for in the manual. Printed tutorials not only require a user to locate the reference manuals, but they require a user to follow a lesson plan which may be arranged in an order in which the user is not comfortable following.

On-line references are easily accessible and they provide reference information relating to tasks. Context-sensitive help keys provide information about what the user is currently doing in the application program, but only to a limited degree. When a help key is depressed, a search is performed on the on-line reference file for a particular topic. The on-line reference file does not communicate with the application program in any way, allowing the user to be easily confused about required ordering of tasks. A user could read about, for example, how to print a word processing document even before the document is formatted. Using an on-line reference is similar to using a printed reference; the user must know what the user wants to do and search for the information the user needs to do the next task. On-line references do not make any attempt to interact with the application program.

On-line tutorials attempt to teach a user how to perform application program tasks, but they are separate from the application program in such a way that a user cannot use the application program and the tutorial at the same time. The user can only interact with the on-line tutorial in a limited manner, using canned data that may have no meaning to the user and certainly no correlation to the data the user will later use with the application program. The user must also complete an entire lesson on related tasks before exiting the tutorial and trying to perform a particular task with the user's own data.

It would be helpful to have a coaching system that went beyond the above types of documentation to teach a user of an application program how to perform application program tasks while actually running the application program and using the user's own data. It would also be helpful if the coaching system could guide the user's progress in such a way that if the user attempted to perform a task from the wrong place in the application program, the coaching system would notify the user and guide the user to the appropriate place in the application program for the desired task. Because novice users do not always know exactly what task they want to perform, the coaching system should help the user determine the task to be performed to achieve the result desired by the user. At this time, there are no such coaching systems available to a user of a computer system running an application program.

SUMMARY AND OBJECTS OF THE INVENTION

It is an object of the present invention to provide an improved method and system for teaching a user of an application program how to perform application program tasks.

A further object of the present invention is to teach a user to perform application program tasks while using the user's own data.

A further object of the present invention is to allow a user to interact freely with an application program while receiving on-line instruction on how to perform an application program task.

A further object of the present invention is to integrate learning how to perform an application program task with performing the same application program task so as to allow the user to be immediately productive.

A further object of the present invention is to provide personalized guidance through application program tasks by presenting possible choices to the user relating to what the user wants to do next and then providing the user with the information the user needs to do it. These and other objects will be apparent to those of ordinary skill in the art as the invention is described more fully below.

In a preferred embodiment, the above objects are provided by a method and computer system for coaching a user how to perform application program tasks. The user activates the coaching program of the present invention while an application program is running on the computer system. If the user needs such assistance, the coaching program helps the user determine the next task the user wishes to perform in the application program. The coaching program then determines if the application program is in the correct state for performance of the next task. If the application program is not in the correct state, the coaching program guides the user through performing essential preliminary tasks that place the application program in the correct state for performance of the next task. The computer system simultaneously displays on the display screen output, such as application program instructions, generated by the coaching program and a user interface display generated by the application program. The output generated by the coaching program always overlays the user interface display in such a way that it does not block the working portion of the user interface display and it does not interrupt the operation of the application program. The user performs the next task in the application program by interacting with the working the portion of the user interface display, while the computer system continues to display the output generated by the coaching program. This enables the user to read instructions displayed on the display screen on how to perform the next task during performance of the next task.

BRIEF DESCRIPTION OF THE DRAWINGS

FIG. 5 illustrates a table containing essential prerequisite tasks, along with questions the coaching program must ask the database program, and remedies in case the questions are answered in the negative, for each preliminary task option.

FIG. 6 illustrates a table containing the subtasks associated with each preliminary task option.

DETAILED DESCRIPTION OF THE INVENTION

The present invention is best understood with reference to a preferred embodiment illustrated in FIGS. 1–6. In the preferred embodiment described below, the application program running on the computer system is a database program. It will be apparent to those skilled in the art that the present invention can be used with other types of application programs.

Figure 1:
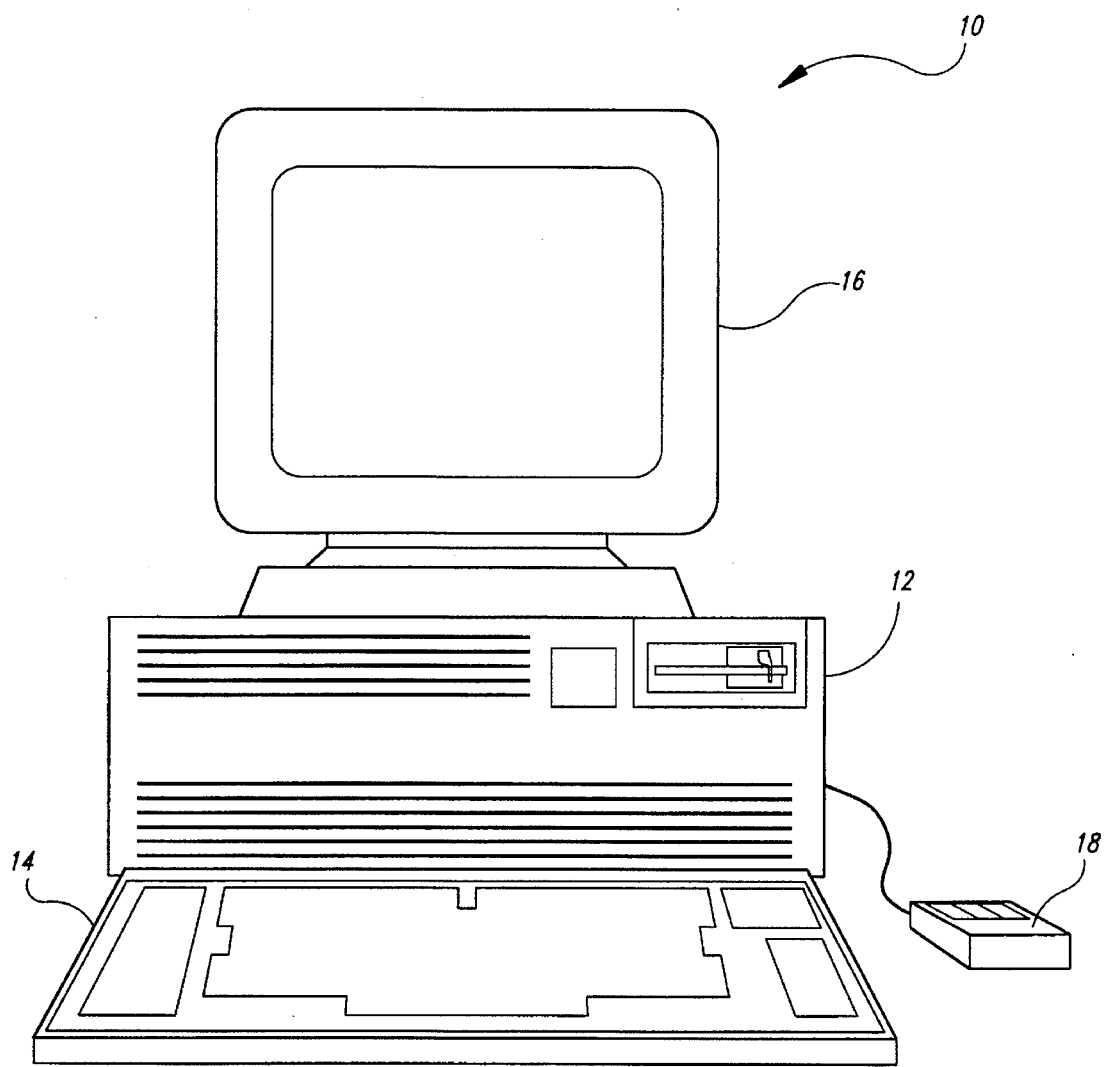
FIG. 1 illustrates a computer system having a CPU, a keyboard, a display screen, and a mouse, and running a database application program simultaneously with the coaching program of the present invention.

FIG. 1 shows a computer system 10 having a CPU 12, a keyboard 14, a display screen 16, and a mouse 18. In a preferred embodiment, as a user is using the computer system 10 running an application program, the user activates the coaching program of the present invention to learn how to perform application program tasks. The coaching program does not interrupt the running application program or the user's interaction with the running application program. The outputs generated by the coaching program and the application program are simultaneously displayed on the display screen 16 of the computer system 10 in such a way that the user's view of the application program output is not blocked by the coaching program output. As a database program is running on the computer system, output is generated in the form of a user interface display and displayed on the display screen 16. A user interacts with the database program by inputting and manipulating data using database tasks. Data is input and tasks are performed in the working portion of the user interface display. Examples of database tasks include creating a table, entering or editing data, modifying an existing table, and choosing a data type. The coaching program described herein teaches the user of the computer system running the database program how to perform database tasks using the user's own data. The coaching program communicates with the user and the database program.

Figure 2:
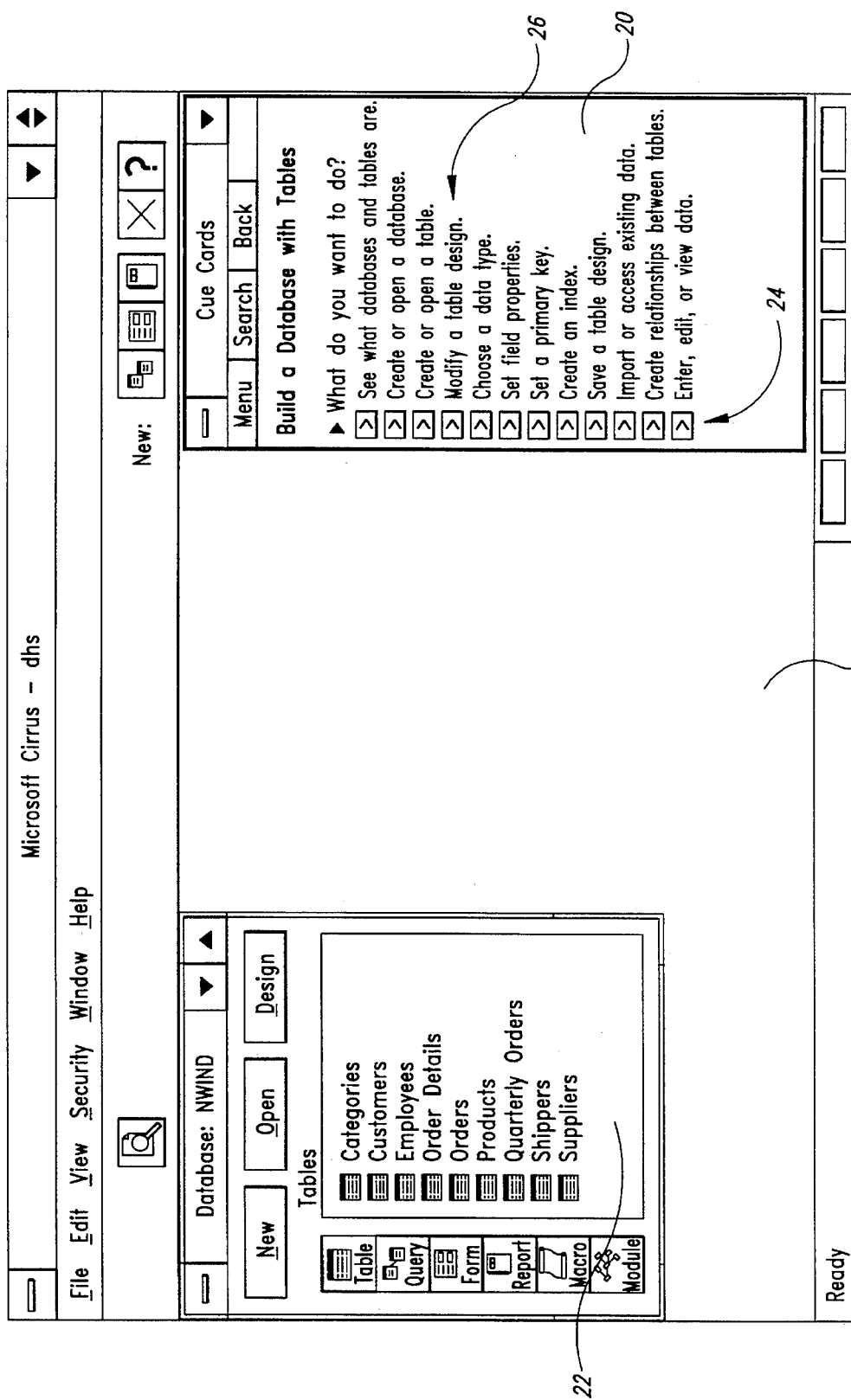
FIG. 2 shows an enlarged view of the display screen of FIG. 1 displaying output generated by the coaching program and a user interface display generated by the database program, immediately after the user has activated the coaching program.

FIG. 2 shows an enlarged view of the display screen 16 of FIG. 1, as viewed by the user, immediately after the user has activated the coaching program. An output 20 generated by the coaching program is simultaneously displayed on the display screen along with an output 22 from the database program. The output from the database program is a user interface display, which has a working portion with which the user interacts. The output from the coaching program is displayed without blocking the user's view of the working portion of the user interface display. The user's interaction with the coaching program does not affect operation of the database program.

If the user needs assistance in selecting an appropriate task to perform next, the coaching program helps the user by generating and displaying a list of user selectable preliminary task options 24 as shown in FIG. 2. The preliminary task options are generalized tasks that have one or more corresponding subtasks. When a user selects a preliminary task option as the next task, the coaching program either generates and displays a set of questions and user selectable alternative answers to the questions, or it communicates with the application program to clarify what the subtask will be. This question and answer process is discussed later in this description with reference to FIG. 5.

After the user has selected a preliminary task option as the next task, or after the user has selected a subtask as the next task, the coaching program communicates with the database program through a dynamic link library (DLL) to make sure the database program is in the proper state for that task. A dynamic link library is a separate file that contains functions that can be called by one or more programs, or by other dynamic link libraries, to perform certain jobs. The coaching program determines whether the database program is in the proper state for performance of the next task by checking to see if all of the essential preliminary tasks for the next task have been performed. FIG. 5, which is described below, illustrates the essential prerequisite tasks for each preliminary task option. If the database is not in the proper state for the next task, the coaching program provides a remedy by asking the user if the user wants to perform the essential prerequisite tasks that would place the database in the proper state. If the user chooses to perform the essential prerequisite tasks, the coaching program provides instructions on how to perform those tasks.

Figure 3:
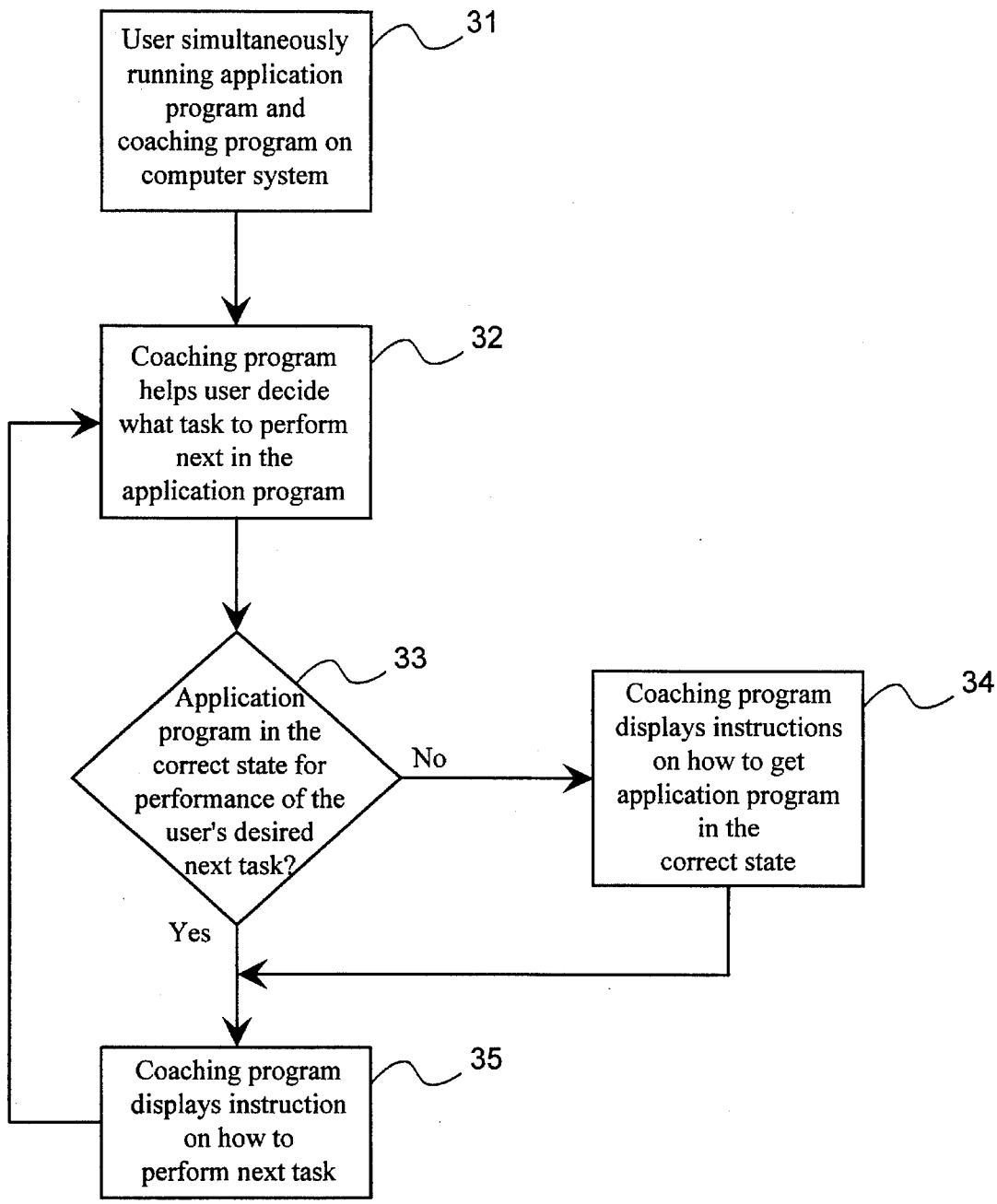
FIG. 3 is an overview flow diagram of the coaching program.

FIG. 3 is an overview flow diagram of a preferred embodiment of the present invention. In block 31, the user activates the coaching program of the present invention on the computer system 10 of FIG. 1. A database program is already running on the computer system when the coaching program is activated. The process continues on to block 32 where the coaching program helps the user decide what task to perform next in the application program. The coaching program uses variables to remember what tasks have already been performed so it can guide the user accordingly. In block 33, the coaching program determines if the application program is in the correct state for the performance of the next task selected by the user. The coaching program makes such a determination by communicating with the application program through the dynamic link library. If the application program is not in the correct state for the performance of the next task selected by the user, the process continues on to block 34 where the coaching program displays instructions on how to get the application program in the correct state for performance of the next task. In any case, the process continues on to block 35 where the coaching program displays instructions on how to perform the next task. After the user has performed the next task, the process loops back to block 32 where the coaching program helps the user to decide what the next task to be performed should be.

Figure 4A:
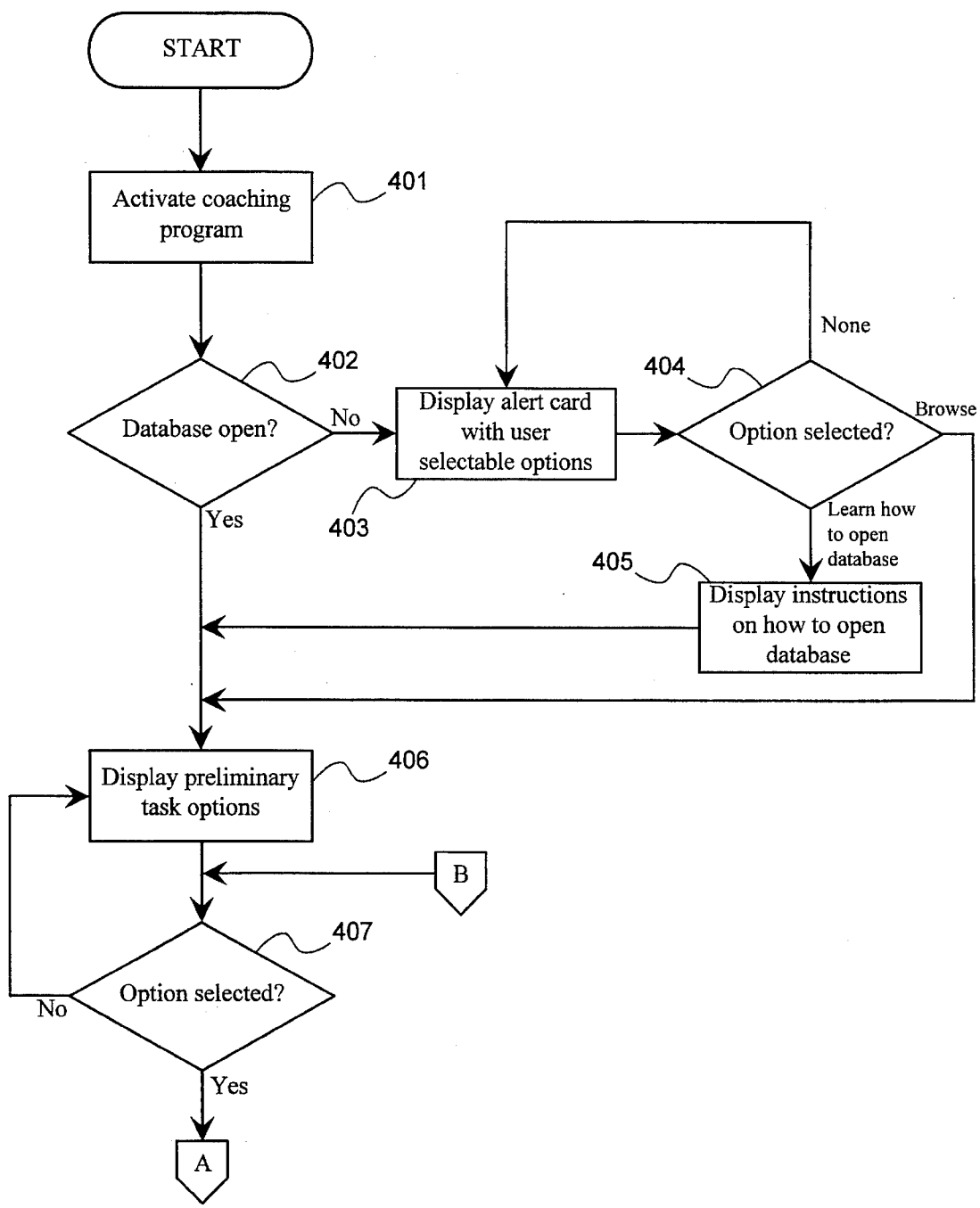
FIGS. 4a and 4b are detailed flow diagrams of the coaching program.
Figure 4B:
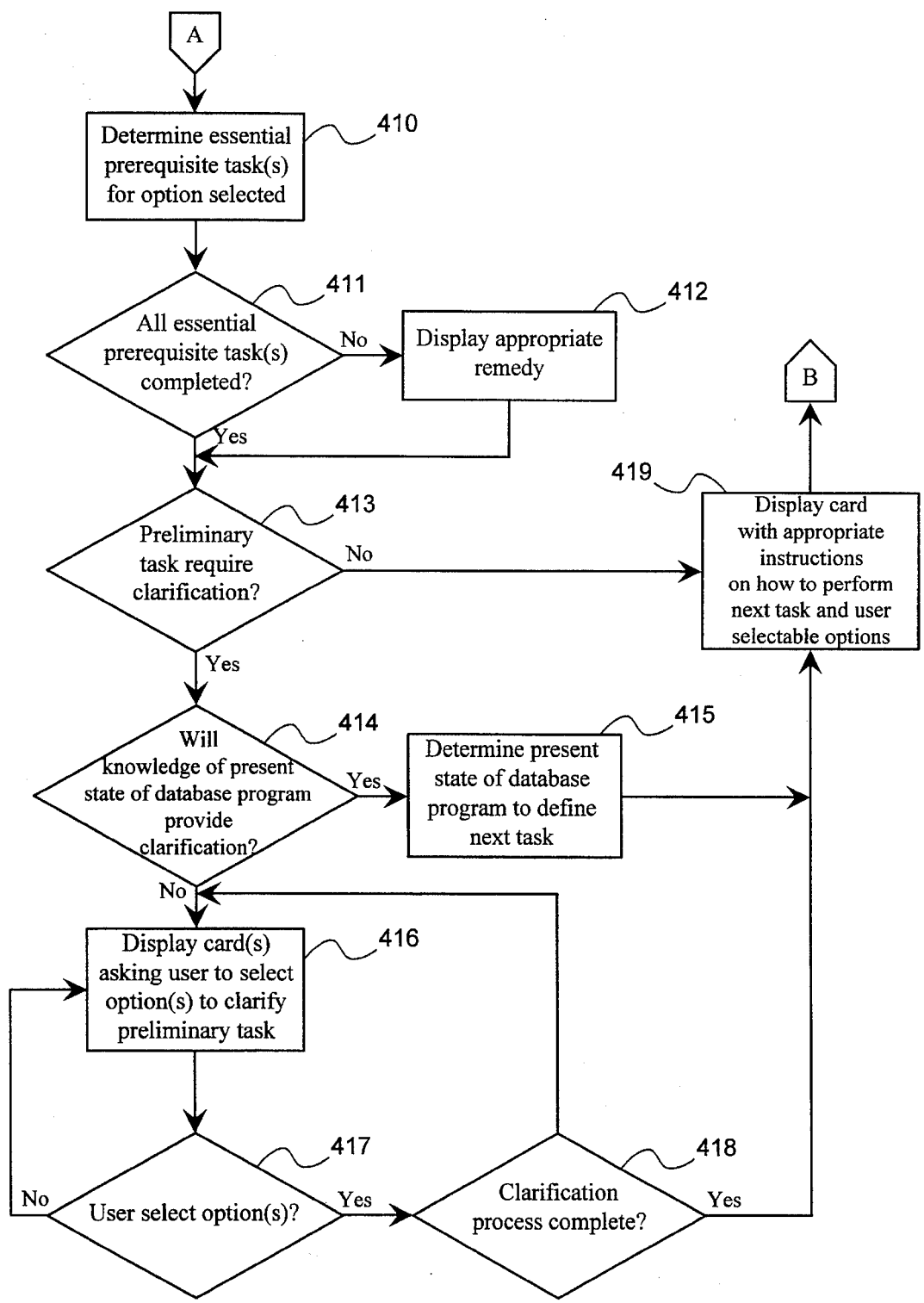

FIGS. 4a and 4b are detailed flow diagrams of a preferred embodiment of the present invention. The process starts in block 401 when the user activates the coaching program. The process continues on to block 402 where the coaching program determines if the database program contains an open database. The coaching program makes such a determination by communicating with the application program through the dynamic link library. In order to perform database tasks, a database must be open. If there are no databases to choose from, one must be created. If a database is not open, the process continues on to block 403 where the coaching program displays a message indicating that a database is not open, along with user-selectable options. In this example, the options the user may select from include "Learn how to open a database," and "Browse the instructions." In block 404, the process checks to see which option the user selects. If the user does not select an option, the process merely loops back to block 403. If the user selects the browse option, the process skips to block 406. If the user selects the option of learning how to open a database, the process continues on to block 405 where the coaching program displays instructions on how to open a database. The output generated by the coaching program is displayed on the display screen 16 of the computer system 10 simultaneously with the output from the application program. The application program always has the focus, which means that the output generated by the coaching program never interrupts the user's interaction with the application program.

If the coaching program determines in block 402 that a database is open, the process continues on to block 406 where the coaching program displays a list of preliminary task options. The preliminary task options are generalized tasks designed to help the user determine what the next task should be. Instead of displaying a long list containing every possible task, a shorter list of preliminary task options is displayed. This way, the user can pick a general category and the coaching program will then help the user narrow the preliminary task option to a subtask, as will be described below. A table containing preliminary task options and their corresponding subtasks is found in FIG. 6.

After the preliminary task options are displayed in block 406, the process continues to block 407, where the coaching program waits for the user to select one of the displayed preliminary task options. The process loops between blocks 407 and 406 while waiting for the user to select a preliminary task option. After the user has selected a preliminary task option, the process continues on to block 410 in FIG. 4b, where the coaching program determines the essential prerequisite tasks for the preliminary task option selected. This determination may be made by the coaching program selecting the essential prerequisite task that corresponds to the preliminary task option from a table as shown in FIG. 5.

In block 411, the coaching program communicates with the database program to determine whether all essential prerequisite tasks have been completed. This process is described in more detail below. If the coaching program determines that all of the essential prerequisite tasks have not been completed, the process continues on to block 412 where the coaching program displays an appropriate remedy. The remedy consists of instructions on how to perform any essential prerequisite task that has not been completed. In any case, the process continues to block 413 where—if the preliminary task has several corresponding subtasks—the coaching program takes steps to clarify exactly what the user wants to do. This step is designed to clarify the preliminary task option so that the coaching program can display instructions for a particular subtask. FIG. 6 illustrates the subtasks that correspond to each preliminary task option.

If the preliminary task option requires further clarification, the process continues on to block 414 where the coaching program determines whether knowledge of the present state of the database program will provide the clarification needed. An example of when knowledge of the present state of the database program will provide clarification is when the preliminary task option is "troubleshoot a query." The coaching program can communicate with the database program through the dynamic link library to determine what type of query is open in the database program. After that determination is made, the coaching program can then display troubleshooting instructions for whichever type of query is open in the database program.

If knowledge of the present state of the database program will not provide further clarification, the process continues on to block 416 where the coaching program causes a question and corresponding user-selectable alternative answers to be displayed on the display screen 16 to clarify exactly what task the user wishes to perform next. For example, if the user chose the preliminary task option "create or open a table," the coaching program would ask the user "Do you want to create a new table or work with an existing table?" User-selectable alternative answers to the question would be displayed underneath the question on the display screen. Continuing with the same example, the options would be "create a new table" and "work with an existing table." If the user selected "work with an existing table," the coaching program would then ask the user "Do you want to alter a table structure or add data to a table?" Again, user-selectable alternative answers to the question would be displayed on the display screen below the question. If the user selected "alter a table structure," the coaching program would then know that the subtask would be to open a table in design view and it would display instructions on how to open a table in design view.

The clarification process may be different for each preliminary task option. Some options will require more questions than others, and each option may ask entirely different questions. By communicating with the user, the coaching program defines the next task the user wishes to perform. It is conceivable that, as the user's task performing skills develop, the user will not need to go through the task clarification process. In that case, the user could select the next task to be performed with no help from the coaching program.

In block 417 of the detailed flow diagram of FIG. 4b, the process checks to see whether the user has selected one of the alternative answers displayed on the display screen. The process loops back to block 416 until the user has selected an option. Once the user has selected an option, the process continues on to block 418 where it queries whether a subtask has been defined as the next task. In other words, the process determines if the clarification process has been completed. If the clarification process has not been completed, the process loops back to block 416 where additional questions and user-selectable alternative answers are displayed on the display screen. If the clarification process is complete, the process continues on to block 419 where the coaching program causes the appropriate instructions on how perform the next task to be displayed on the display screen. After the instructions are displayed on the display screen, the coaching program helps the user, determine what the next task should be by looping back to block 407, found in FIG. 4a. The coaching program uses variables to remember what tasks the user has performed in the past so that it may logically suggest what the next task should be.

FIG. 5 illustrates a table having corresponding lists of preliminary task options 24, essential prerequisite tasks 53, questions to be asked of the database program, 51a and 51b, and remedies in case the database answers the questions in the negative, 52a and 52b. The essential prerequisite tasks are tasks that must be performed before the corresponding next task can be performed. For any preliminary task option selected by the user, the coaching program communicates with the database program through the dynamic link library to determine if the corresponding essential prerequisite task has been performed.

This communication begins with the coaching program asking the database the question from the list of first questions 51a that corresponds to the next task that has been selected. If the question is answered by the database program in the negative, the coaching program offers the user the corresponding remedy from the list of first remedies 52a. The remedy includes instructions on how to perform the essential preliminary task. If the question is answered by the database program in the affirmative, a second question is asked. The same actions are taken with respect to the list of second questions 51b and corresponding second remedies 52b. It is apparent to one skilled in the art that more than two questions may be asked of the database program.

Referring to FIG. 5, and using the specific preliminary task option 26, "Modify a table design," from the list of preliminary task options 24 as an example, it can be seen that a database needs to be open and a table has to be open in design view in order to modify a table design. The first question the coaching program asks the database program from the list of first questions 51a is whether a table is open (see question 55). If a table is not open, the coaching program provides an associated remedy to the user from the list of first remedies 52a by displaying instructions on how to open a table in design view (see remedy 56). If a table is open, the coaching program asks the database program a question from the list of second questions 51b. In this instance the coaching program asks whether a table is open in design view (see question 57). If a table is not open in design view, the coaching program provides an associated remedy to the user from the list of second remedies 52b by displaying instructions on how to switch to design view (see remedy 58).

Although the methods and systems of the present invention have been described in terms of a preferred embodiment, it is not intended that the invention be limited to this embodiment. Modifications within the spirit of the invention will be apparent to those skilled in the art. It will be apparent to those skilled in the art that the present invention can be used in other types of application programs besides database programs. The scope of the present invention is defined only by the claims that follow.

I claim:

1. A method of coaching a user of a computer system running an application program, where the user manipulates the user's own data by performing various application program tasks, and where the computer system includes a display screen, the method comprising the steps of:

providing a coaching program to be run on the computer system while the application program is running;

activating the coaching program while the application program is running;

under control of the coaching program, determining a next task the user wishes to perform in the application program;

simultaneously displaying on the display screen application program instructions generated by the coaching program for performance of the next task and a user interface display generated by the application program, the user interface display having a working portion used by the user to perform the next task, with the application program instructions overlaying the user interface display without blocking the working portion of the user interface display and without interrupting the operation of the application program; and performing the next task in the application program by using the working portion of the user interface display while continuing to display the application program instructions so that the application program instructions displayed on the display screen during performance of the next task are readable to the user.

2. The method of claim 1 wherein the step of determining a next task further includes determining a current state of the application program.

3. The method of claim 2 wherein the step of determining the current state of the application program includes calling a function stored in a dynamic link library to ascertain whether a predefined condition has been met.

4. The method of claim 1 wherein the step of determining the next task includes the additional steps of:

determining the current state of the application program; and determining whether the next task is performable based on the current state of the application program.

5. The method of claim 4 wherein the step of determining whether the next task is performable includes the additional steps of:

determining whether the next task to be performed has any essential preliminary tasks which must be performed before the next task is performed; and determining whether the essential preliminary tasks for the next task have been performed.

6. The method of claim 5 including, subsequent to the step of determining whether the essential preliminary tasks for the next task have been performed, the step of providing a remedy to the user if the next task has an essential preliminary task that has not been performed.

7. The method of claim 6 wherein the step of providing a remedy to the user includes the step of simultaneously displaying on the displaying screen application program instructions generated by the coaching program for performance of essential preliminary tasks and the user interface display, with the instructions overlaying the user interface display without blocking the working portion of the user interface display and without interrupting the operation of the application program.

8. The method of claim 1 wherein the step of determining the next task includes the additional steps of:

simultaneously displaying on the display screen a list of preliminary task options generated by the coaching program and the user interface display generated by the application program, the list of preliminary task options overlaying the user interface display without blocking the working portion of the user interface display and without interrupting the operation of the application program;

selecting a preliminary task option from the list of preliminary task options displayed on the display screen; and undertaking a task clarification process to define the next task in response to the preliminary task option being selected.

9. The method of claim 8 wherein the step of undertaking a task clarification process includes the addition steps of:

displaying on the display screen at least one question regarding the selected preliminary task option to assist the user in identifying the next task to be performed;

displaying on the display screen alternative user selectable answers for each displayed question regarding the selected preliminary task option on the display screen;

selecting an answer from the displayed alternative user selectable answers for each displayed question; and choosing a task from a list of available application program tasks, the task chosen being the task which most closely corresponds to the selected alternative answer for each displayed question, as the next task the user wishes to perform.

10. The method of claim 8 wherein the step of undertaking a task clarification process includes the additional step of determining the current state of the application program.

11. A method of coaching a user of a computer system running an application program, where the user manipulates data by performing various application program tasks, and where the computer system includes a display screen, the method comprising the steps of:

providing a coaching program to be run on the computer system while the application program is running;

activating the coaching program while the application program is running in a current state; and under control of the activated coaching program, receiving from the user an indication of a next task to be performed;

in response to receiving the indication, determining the current state of the application program;

determining whether the next task is performable by the application program in its current state; and when the next task is not performable by the application program displaying application program instructions on how to put the application program in a state to perform the next task.

12. The method of claim 11 including, the step of when the next task is not performable by the application program notifying the user that the next task the user wishes to perform is not performable in the current state of the application program.

13. The method of claim 12 including the step of when the next task is not performable by the application program, displaying the current state.

14. The method of claim 12 wherein in the step of notifying the user that the next task the user wishes to perform is not performable includes the steps of:

displaying on the display screen a message indicating that the next task is not performable in the current state of the application program; and displaying on the display screen at least one user selectable response to the displayed message, the selectable response indicating whether the user would like to proceed to a state in the application program where the next task is performable.

15. The method of claim 11 wherein the step of displaying includes the steps of:

determining in which state the application program needs to be for performance of the next task the user wishes to perform;

after determining in which state the application program needs to be for performance of the next task, determining what tasks need to be performed to place the application program in the determined state; and displaying on the display screen application program instructions generated by the coaching program for performance of the tasks that need to be perforated to place the application program in the determined state.

16. A method of coaching a user of a computer system running an application program, where the user manipulates data by performing various application program tasks, and where the computer system includes a display screen, the method comprising the steps of:

providing a coaching program to be run on the computer system while the application program is running;

activating the coaching program while the application program is running;

determining a next task the user wishes to perform in the application program;

determining a current state of the application program;

determining whether the next task is performable based on the current state of the application program;

simultaneously displaying on the display screen a list of preliminary task options generated by the coaching program and a user interface display generated by the application program, the user interface display having a data entry portion used by the user to perform the next task, the list of preliminary task options overlaying the user interface display without blocking the data entry portion of the user interface display and without interrupting the operation of the application program;

selecting a preliminary task option from the list of preliminary task options displayed on the display screen;

performing a task clarification process to define the next task in response to the preliminary task option being selected;

simultaneously displaying on the display screen application program instructions generated by the coaching program for performance of the next task and the user interface display generated by the application program, the application program instructions overlaying the user interface display without blocking the data entry portion of the user interface display and without interrupting the operation of the application program; and performing the next task in the application program by using the data entry portion of the user interface display while continuing to display the application program instructions that overlay the user interlace display so that the application program instructions displayed on the display screen during performance of the next task are readable to the user.

17. A computer system for coaching a user of the computer system running an application program, where the user manipulates data by performing various application program tasks, and where the computer system includes a display screen, the computer system comprising:

means for activating a coaching program while the application program is running;

means for determining a next task the user wishes to perform in the application program under control of the coaching program;

means for simultaneously displaying on the display screen application program instructions generated by the coaching program for performance of the next task and a user interface display generated by the application program, the user interface display having a working portion used by the user to perform the next task, with the application program instructions overlaying the user interface display without blocking the working portion of the user interface display and without interrupting the operation of the application program; and means for performing the next task in the application program by using the working portion of the user interface display while continuing to display the application program instructions that overlay the user interface display so that the application program instructions displayed on the display screen during performance of the next task are readable to the user.

18. The computer system of claim 17 wherein the means for determining the next task additionally comprises a means for determining a current state of the application program.

19. The computer system of claim 18 wherein the means for determining the current state of the application program additionally comprises a means for calling a function stored in a dynamic link library to ascertain whether a predefined condition has been met.

20. The computer system of claim 17 wherein the means for determining the next task additionally comprises:

means for determining the current state of the application program; and means for determining whether the next task is performable based on the current state of the application program.

21. The computer system of claim 20 wherein the means for determining whether the next task is performable additionally comprises:

means for determining whether the next task to be performed has any essential preliminary tasks which must be performed before the next task is performable; and means for determining whether the essential preliminary tasks for the next task have been performed.

22. The computer system of claim 21 additionally comprising a means for providing a remedy to the user if the next task has an essential preliminary task that has not been performed.

23. The computer system of claim 22 wherein the means for providing a remedy to the user additionally comprises a means for simultaneously displaying on the display screen application program instructions generated by the coaching program for performance of essential preliminary tasks and the user interface display, with the instructions overlaying the user interface display without blocking the working portion of the user interface display and without interrupting the operation of the application program.

24. The computer system of claim 17 wherein the means for determining the next task additionally comprises:

means for simultaneously displaying on the display screen a list of preliminary task options generated by the coaching program and the user interface display generated by the application program, the list of preliminary task options overlaying the user interface display without blocking the working portion of the user interface display and without interrupting the operation of the application program;

means for selecting a preliminary task option from the list of preliminary task options displayed on the display screen; and means for undertaking a task clarification process to define the next task in response to the preliminary task option being selected.

25. The computer system of claim 24 wherein the means for undertaking a task clarification process additionally comprises:

means for displaying on the display screen at least one question regarding the selected preliminary task option to assist the user in identifying the next task to be performed;

means for displaying on the display screen alternative user selectable answers for each displayed question regarding the selected preliminary task option on the display screen;

means for selecting an answer from the displayed alternative user selectable answers for each displayed question; and means for choosing a task from a list of available application program tasks, the task chosen being the task which most closely corresponds to the selected alternative answer for each displayed question, as the next task the user wishes to perform.

26. A method in a computer system, which includes a display screen and a user input device, and which is running an application program and a coaching program, the method comprising the following steps:

a) maintaining task information indicating which tasks a user has already performed;

b) determining which tasks are performable next based on the task information;

c) displaying a list of tasks which are performable next based on the task information on the display screen;

d) selecting a task from said list of tasks to perform next based on user input from the user input device and communications with the application program;

e) displaying instructions to perform the selected task on the display screen.

27. A method as recited in claim 26 wherein step (c) further comprises the step of displaying on the display screen simultaneously a list of tasks generated by the coaching program and a user interface display generated by the application program, the user interface display having a data entry portion used by the user to perform the task, the list of tasks overlaying the user interface display without blocking the data entry portion of the user interface display and without interrupting the operation of the application program.

28. A method as recited in claim 26 wherein step (e) further comprises the step of displaying on the display screen simultaneously instructions generated by the coaching program and a user interface display generated by the application program, the user interface display having a data entry portion used by the user to perform the next task, the instructions overlaying the user interface display without blocking the data entry portion of the user interface display and without interrupting the operation of the application program.

29. A computer system having an input device, an output device, a memory means, and a processing means running an application program wherein the application program has a current state, the computer system comprising:

means for providing a coaching program and task information for application program tasks;

means for storing the coaching program and task information in the memory means;

means for activating the coaching program while the application program is running;

means for, under control of the coaching program, determining a next task for the application program to perform using the task information;

means for displaying on the output device instructions for performing the next task generated by the coaching program; and means for performing the next task in the application program while continuing to display on the display device the instructions for performing the next task.

30. The system as recited in claim 29 further comprising means for determining whether the next task is performable by the application program in its current state.

31. The system as recited in claim 30 further comprising:

means for the coaching program to communicate with the application program to determine the current state of the application program;

means for determining whether the next task is performable by the application program based on the communicated current state of the application program, and means for displaying on the output device instructions generated by the coaching program to place the application program in a state for performing the next task when the application program cannot perform the next task in its current state.

32. The system as recited in claim 31 further comprising:

means for determining whether any preliminary tasks must be performed before the next task is performable; and means for providing a remedy based on the task information when the next task has a preliminary task that has not been performed.

33. The system as recited in claim 29 comprising:

means for providing a list of preliminary task options based on the task information:

means for receiving user input from the user input device selecting a preliminary task option;

means for communicating with the application program to perform task clarification; and means for receiving user input from the user input device to determine a next task when communicating with the application program does not complete task clarification.

* * * * *

UNITED STATES PATENT AND TRADEMARK OFFICE
CERTIFICATE OF CORRECTION

PATENT NO. : 5,481,667
DATED : January 2, 1996
INVENTOR(S) : Cynthia L. Bieniek, Ross A. Hunter, Timothy P. McKee and David H. Schroeder It is certified that error appears in the above-indentified patent and that said Letters Patent is hereby corrected as shown below:

In column 9, claim 9, line 31, please delete "addition" and insert therefor --additional--.

In column 10, claim 12, line 1, following "including" please delete --,--.

In column 10, claim 15, line 31, please delete "perforated" and insert therefor --performed--.

In column 11, claim 16, line 7, please delete "interlace" and insert therefor --interface--.

Signed and Sealed this

Twenty-fifth Day of June, 1996

*Attest:*

BRUCE LEHMAN

*Attesting Officer*     *Commissioner of Patents and Trademarks*